United States Patent [19]

Eisele et al.

[11] 3,994,267
[45] Nov. 30, 1976

[54] FUEL INJECTION SYSTEM FOR MIXTURE-COMPRESSING, EXTERNALLY IGNITED, STRATIFIED CHARGE, INTERNAL COMBUSTION ENGINES

[75] Inventors: Hermann Eisele, Nellingen; Otto Glöckler, Renningen; Heinrich Knapp, Leonberg-Silberberg; Gerhard Stumpp, Stuttgart, all of Germany

[73] Assignee: Robert Bosch G.m.b.H., Stuttgart, Germany

[22] Filed: June 28, 1974

[21] Appl. No.: 484,150

[30] Foreign Application Priority Data
June 30, 1973 Germany............................ 2333451

[52] U.S. Cl................................. 123/32 ST; 123/75 B; 123/139 AW; 123/139 BG
[51] Int. Cl.²..................... F02M 69/00; F02B 19/10
[58] Field of Search.. 123/32 ST, 139 AW, 139 BG, 123/32 G, 119 R, 32 SP, 191 S, 191 SP, 75 B

[56] References Cited
UNITED STATES PATENTS

| | | | |
|---|---|---|---|
| 2,121,920 | 6/1938 | Mallory | 123/75 B |
| 3,443,552 | 5/1969 | Vonseggern et al. | 123/32 ST |
| 3,508,530 | 4/1970 | Clawson | 123/191 S |
| 3,680,535 | 8/1972 | Eckert et al. | 123/139 AW X |
| 3,728,993 | 4/1973 | Eckert et al. | 123/139 AW X |
| 3,739,758 | 6/1973 | Knapp et al. | 123/119 R |
| 3,739,762 | 6/1973 | Jackson | 123/139 AW X |
| 3,809,036 | 5/1974 | Knapp et al. | 123/119 R |
| 3,824,965 | 7/1974 | Clawson | 123/32 ST X |

*Primary Examiner*—Charles J. Myhre
*Assistant Examiner*—Tony M. Argenbright
*Attorney, Agent, or Firm*—Edwin E. Greigg

[57] ABSTRACT

A fuel injection system utilized with an engine having pre-combustion chambers, main combustion chambers, a fuel metering and quantity distribution valve, a suction tube and an air measuring member are described in further detail hereinafter. The fuel metering and quantity distribution valve has a control slide member which is controlled in its displacement by the air measuring member. The control slide member controls the fuel metered to the engine. The fuel metering and quantity distribution valve has a first differential pressure valve associated therewith which maintains the pressure difference between the fuel pressure prevailing upstream and downstream of the fuel metering location constant during injection. Structure is provided to change the pressure difference in dependence on engine parameters.

6 Claims, 2 Drawing Figures

Fig.1

FUEL INJECTION SYSTEM FOR MIXTURE-COMPRESSING, EXTERNALLY IGNITED, STRATIFIED CHARGE, INTERNAL COMBUSTION ENGINES

BACKGROUND OF THE INVENTION

The invention to a fuel injection system for mixture compressing, externally ignited, stratified charger internal combustion engines with separate, continuous fuel supply to the suction tubes of the pre-combustion chambers and of the main combustion chambers of the engines.

In known stratified charge, internal combustion engines of this kind, a relatively rich fuel-air mixture is supplied through a second inlet valve into a pre-combustion chamber and ignited. The ignition flame shooting out of the pre-combustion chamber is capable of igniting the relatively lean fuel-air mixture in the main combustion chamber so as to undergo an extended combustion process. Carburetors are employed to supply fuel to the pre-combustion and main combustion chambers and relatively favorable exhaust gas values are achieved.

OBJECTS AND SUMMARY OF THE INVENTION

It is an object of the invention to provide a fuel injection system for mixture-compressing, externally ignited, stratified charge, internal combustion engines having pre-combustion and main combustion chambers which permit an exact metering of fuel so as to prevent the formation of toxic exhaust gases.

It is a more specific object of the invention to provide means which permit an exact metering of fuel by controlling the pressure differences existing on both sides of the fuel metering location in dependence on engine parameters.

Briefly stated, these objects are achieved, according to the invention, in that a measuring member, located in the intake region of the suction tube is movable in accordance with the air flow-rate, and against a resetting force, wherein it displaces a control slide of a metering and quantity distribution valve for the purpose of metering out a fuel quantity in proportion to the air quantity, for injection into the pre-combustion and main combustion chambers, and wherein the metering occurs while a constant pressure difference exists between the fuel pressures prevailing ahead of and behind the metering location, but where this pressure difference may be changed in dependence on engine parameters.

Preferred features of a first embodiment of the invention are that the fuel quantity metered out to the main combustion chambers by the metering and quantity distribution valve can be injected into the common suction tube ahead of the main chambers and that the pressure difference prevailing at the first differential pressure valves of the metering and quantity distribution valve can be changed by secondary differential pressure valves, and that the pre-tension of the springs of the secondary differential pressure valves can be changed by a cam which is rotatable in dependence on the position of the gas pedal.

A further preferred feature of the first embodiment of the invention is that the fuel quantity metered out to each pre-combustion chamber at the metering and quantity distribution valve is directly injectable into the individual suction tube branches ahead of each pre-combustion chamber.

Preferred features of a second embodiment of the invention are that a throttle flap is disposed in the suction tube downstream of the measuring member and that the pressure differential at the metering and quantity distribution valve is changeable, in dependence on the vacuum in the common suction tube, by differential pressure valves and by means of a pressure bellows, and that the fuel metered out to the pre-combustion chambers by the metering and quantity distribution valve can be injected by an injection valve into the suction tube directly ahead of the branches leading to the individual pre-combustion chambers.

It is a preferred feature of both embodiments of the invention that the resetting force acting on the metering valve is exerted by pressurized fluid whose pressure is changeable by means of a pressure-control valve and in dependence on engine parameters.

BRIEF DESCRIPTION OF THE DRAWING

The invention will be better understood and further objects and advantages will become more apparent from the esuing detailed specification of two exemplary embodiments of the invention which are depicted in the drawing, wherein.

DESCRIPTION OF THE PREFERRED EMBODIMENTS

Figure 1:
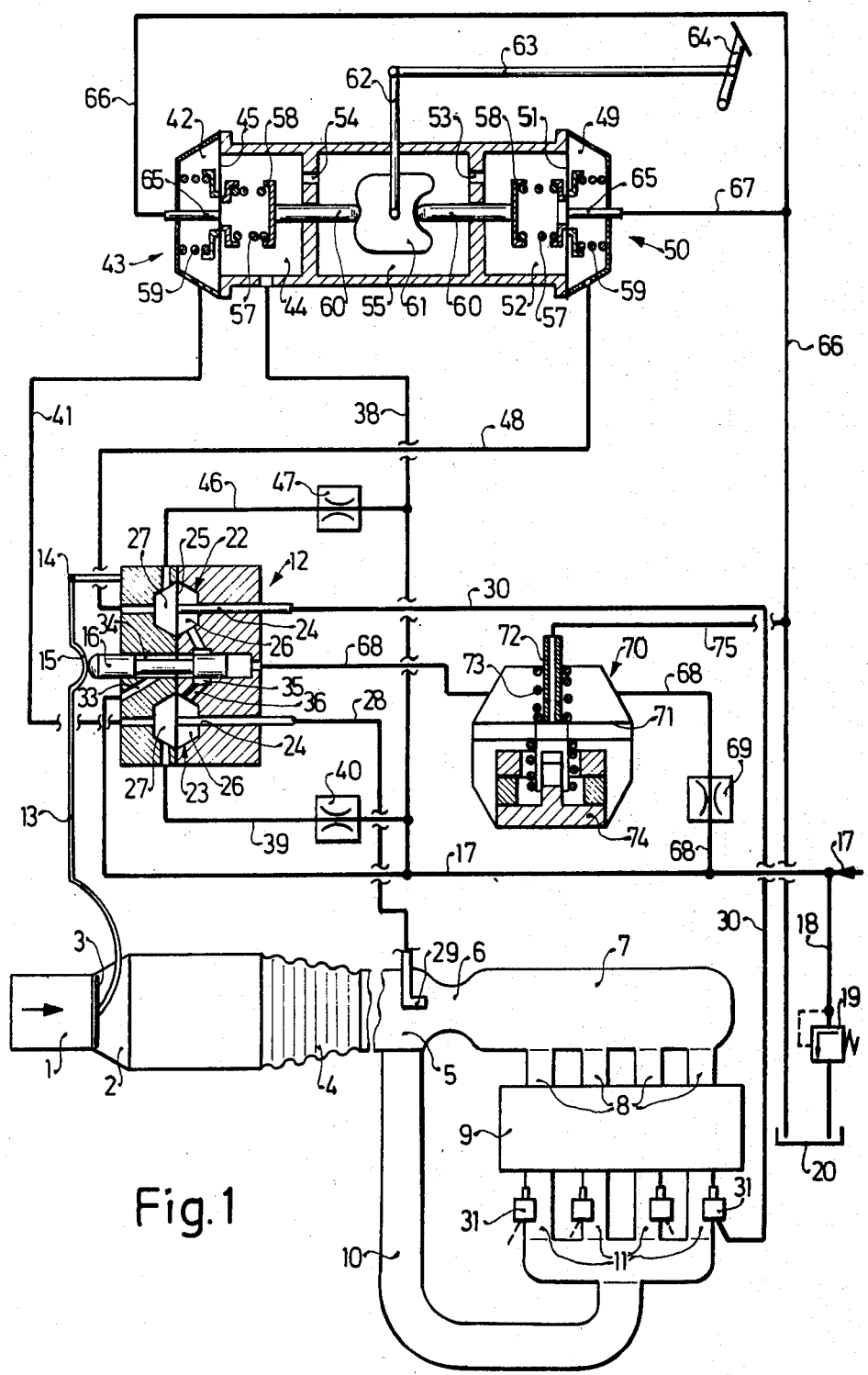
FIG. 1 is a partially sectional diagram of the fuel metering and injection system according to a first preferred, exemplary embodiment of the invention.

Within the fuel injection system shown in FIG. 1, combustion air flows in the direction of the arrow into a suction tube with an inlet region 1, a conical region 2, and past a measuring member 3 disposed therein. The air flows further through a connecting hose 4, a suction tube region 5, and a venturi-shaped section 6 into a common suction tube region 7 from which individual branch tubes 8 lead to the main combustion chambers (not shown) of the internal combustion engine 9. A suction tube region 10 connects the suction tube region 5 with the branch tubes 11 which lead to the individual pre-combustion chambers (not shown) of the internal combustion engine 9.

The measuring member is a plate 3 which moves within the conical region 2 of the suction tube according to an approximately linear function of the air quantity flowing through the suction tube, if the resetting force acting upon it is constant. The measuring member 3 directly conrols a fuel metering and quantity distribution valve 12. The deflections of the measuring member 3 are transmitted to an attached lever 13 which is pivotably mounted at a point 14 and which includes a projection or abutment means 15. During pivotal motions of the lever, its projection 15 actuates a movable valve member or control slide 16 of the metering and quantity distribution valve 12.

Fuel is supplied by means of a fuel pump (not shown) which delivers fuel through a line 17 to the metering and quantity distribution valve 12. Branching off from line 17 is a line 18, in which there is disposed a pressure limiting valve 19, which permits fuel to flow back to a fuel reservoir 20 when the system pressure becomes too high.

The metering process by the metering and quantity distribution valve 12 takes place while a constant pressure difference prevails which is maintained by differential pressure valves 22 and 23, which are embodied as flat seat valves, each having a fixed valve seat 24 and a membrane 25. The membrane separates two chambers 26 and 27. The metered fuel flows from chamber 26 of the differential pressure valve 23 through a line 28 to an injection valve 29 by means of which the fuel metered out to the main combustion chambers is injected into the venturi-shaped region 6 of the suction tube. Depending on the number of engine cylinders, (four in the shown exemplary embodiment), the metering and quantity distribution valve 12 has a corresponding number of first differential pressure valves 22, from which the metered fuel flows through the fixed valve seats 24 and lines 30, of which only one is shown, to the several injection valves 31, which inject the fuel into the individual suction branch tubes 11 directly ahead of the several pre-combustion chambers. The metering and quantity distribution valve 12 receives the fuel from line 17 through a channel 33, from which the fuel reaches an annular groove 34 of the control slide 16. Depending on the position of control slide 16, the annular groove 34 more or less overlaps control slits 35, and communicates with channels 36, each of which leads to a chamber 26 of all the first differential pressure valves 22 and 23.

Branching off from line 17 is a line 38, from which fuel flows through a line 39 and a throttle 40 into the chamber 27 of the first differential pressure valve 23 and this chamber 27 communicates through a line 41 with a chamber 42 of one second differential pressure valve 43, there being provided a second differential pressure valve contructed in tandem and designated 43, 50. The line 38 terminates in a chamber 44 of the second differential pressure valve 43, and this chamber 44 is separated from chamber 42 by a membrane 45.

Further branching off from line 38 is a line 46 containing a throttle 47, from which fuel reaches the chambers 27 of the several first differential pressure valves 22. The chambers 27 communicate through a line 48 with a chamber 49 of the other second differential pressure valve 50. Chamber 49 is separated by a membrane 51 from a chamber 52, which communicates through bores 53 and 54 and the volume 55 with the chamber 44 of the second differential pressure valve 43. Disposed in each of the chambers 44 and 52 is a spring 57 supported by a spring support 58 and acting in opposition to a spring 59 in each of the chambers 42 and 49. The pretension of springs 57 is changeable by means of a follower pin 60 and the cam 61 which is rotatable by the gas pedal 64 via rods 62, 63. When the differential pressure valves 43, 50 are open, fuel can flow back from chambers 42, 49 through the fixed valve seats 65 and through lines 66, 67 into the fuel reservoir 20.

The control slide 16 of the metering and quantity distribution valve 12 is actuated by pressure fluid, which serves as the resetting force for the measuring member 3 and which actuates the control slide 16, through a line 68 in which there is disposed a throttle 69. Line 68 also contains a pressure control valve 70, which is embodied as a flat seat valve with a membrane 71 acting as a movable valve member and a fixed valve member 72. The membrane 71 is loaded in an opening direction by a spring 73, whose pretension is changed by means of an electromagnet assembly 74 in dependence on engine parameters, for example, the oxygen content in the exhaust gas. For this purpose, a so-called oxygen measuring sonde is suitable, which is located in the exhaust system of the internal combustion engine and whose electrical output signal, when amplified, controls the current flowing through the electromagnetic assembly 74. Fuel can return to the fuel reservoir 20 from the pressure control valve through lines 75 and 66.

The operation of the fuel injection system shown in FIG. 1 is as follows:

When the internal combustion engine is running, air is aspirated through suction tube 1, 2, 4, and 5, and it causes a certain deflection of measuring member 3 from its normal position. Depending on the deflection of measuring member 3, the control slide 16 of the metering and quantity distribution valve 12 is also displaced via lever 13. The direct connection between measuring member 3 and control slide 16 results in a proportional relationship between the air flow quantity and the metered fuel quantity. Stratified charge internal combustion engines, having both pre-combustion and main combustion chambers require that fuel be separately metered out and injected corresponding to the air quantity flowing. The requirements with respect to the distribution of fuel to the individual main combustion chambers are not extremely high, so that the fuel for the main combustion chambers may be metered out collectively by the metering valve of the metering and quantity distribution valve 12. The fuel can be injected through the single first differential pressure valve 23 and the injection valve 29 into the venturi-shaped region 6 of the suction tube. The fuel quantities which must be supplied to the pre-combustion chambers are relatively small and for this reason, each pre-combustion chamber has its own metering valve 22 within the metering and quantity distribution valve 12. The fuel is injected, through separate first differential pressure valves 22 and the associated, several injection valves 31, immediately ahead of the pre-combustion chambers, into branch tubes 11 of suction tube region 10. The pre-combustion chambers receive a relatively rich fuel-air mixture, whereas the main combustion chambers are supplied with a relatively lean fuel-air mixture. The fuel quantity injected per cycle into the pre-combustion chambers must be reduced during full load operation, because, otherwise, the increasing injection quantity to the main combustion chambers would make the mixture too rich and would lead to the formation of soot. For the purpose of the actual load regulation, the main combustion chambers must receive a fuel-air mixture which is somewhat leaner than would correspond to the condition $\lambda = 1$, denoting a stoichiometric fuel-air mixture. The load-dependent regulation of the fuel quantity occurs by means of the gas pedal 64, which rotates cam 61, on whose circumference glide the follower pins 60, which, depending on their position, and via spring supports 58, more or less compress the springs 57 of the second differential pressure valves 43 and 50. The resulting change in the differential pressure prevailing at the second differential pressure valves 43 and 50 also causes a modification of the differential pressure at the first differential pressure valves 22 and 23 and therefore causes an adaptation of the metered fuel quantity to the load condition.

A further influence on the proportionality existing between the air quantity and the metered fuel quantity is made possible by the change of the normally constant resetting force acting on control slide 16, and hence on measuring member 3, and exerted by pressure control valve 70. For example, during engine warm-up, certain of its parameters are measured electrically and are amplified and are then used by the electromagnetic assembly 74 to cunteract the tension of the spring 73 of pressure control valve 70, and hence, to change the pressure of the pressure fluid in line 68. Engine parameters are temperature, load, rpm and exhaust gas composition.

Figure 2:
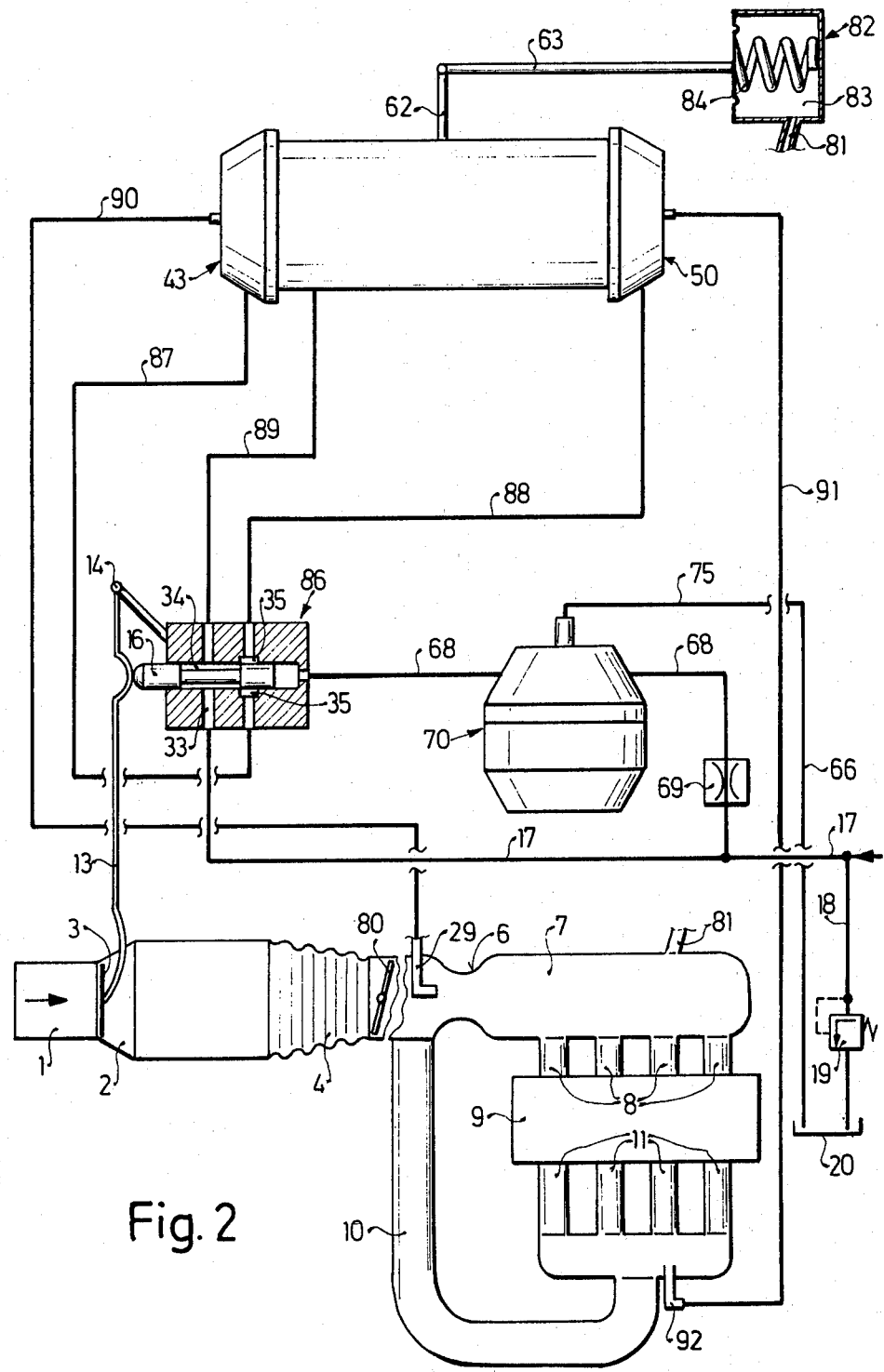
FIG. 2 is a partially sectional diagram of the fuel metering and injection system according to a second preferred, exemplary embodiment of the invention.

FIG. 2 shows a second exemplary embodiment of the apparatus according to the invention, wherein parts of the fuel injection system which are identical to those in FIG. 1 carry the same reference numerals. In order to substantially reduce the hydrocarbon emissions, it is suitable to create a certain level of vacuum within the suction tube; this condition prevents the cylinders from being fully charged. The reduction of unnecessary air increases the exhaust gas temperature. For this purpose, there is disposed, within suction tube region 5, a throttle flap 80, which is directly moved by the gas pedal. In this case, the control parameter for the injection process can be the suction tube vacuum within the common suction tube 7; it is admitted through channel 81 to a bellows 82. The vacuum prevailing in chamber 83 more or less supports spring 84 and causes a rotation of cam 61 via the schematically shown rods 62, 63. The fuel supplied to the metering and quantity distribution valve 86 through the line 17 and the channel 33 and into annular groove 34 is metered out at each control slit 35 depending on the position of control slide 16 and is conducted through lines 87 and 88 to the pair of differential pressure valves 43, 50. From the annular groove 34 of control slide 16, a line 89 carries the fuel unthrottled into chamber 44 and through bores 53 and 55 and volume 55 into the chamber 52. The fuel which is metered out according to the differential pressure prevailing at the differential pressure valve 43 as modified by the vacuum prevailing in suction tube 7, is carried through the fixed valve seat 65 and line 90 to the injection valve 29, which injects the fuel into the venturi-shaped region 6 of the suction tube, ahead of the main combustion chambers of the fuel injection engine. In contrast to the embodiment of FIG. 1, and because of the prevailing vacuum, the fuel which is metered out to the pre-combustion chambers by the metering and quantity distribution valve 86 according to the pressure difference sustained by the differential pressure valve 50, can be delivered through the fixed valve seat 65 and line 91 to a single injection valve 92 and injected into suction tube 10, immediately ahead of the branch tubes 11 leading to the several pre-combustion chambers. This results in an extremely simple injection system which is sufficient for the requirements cited already in the first exemplary embodiment.

A further modification of the fuel-air ratio can be achieved, as was already explained in the description of the first exemplary embodiment, by means of the pressure control valve 70, which can change the resetting force acting on measuring member 3 in dependence on other engine parameters, for example, even during the warm-up operation.

What is claimed is

1. In a fuel injection system for use with mixture-compressing, externally ignited, stratified-charge internal combustion engines, each having pre-combustion chambers and main combustion chambers the system employing a separate and continuous fuel supply to regions of the suction tube of the system for feeding the pre-combustion chambers and the main combustion chambers of the engine, the improvement in the system comprising:
   a. gas pedal;
   b. a suction tube;
   c. a fuel metering and quantity distribution valve including a displaceable control slide member and defining a fuel metering location;
   d. first differential pressure valve means connected to said fuel metering and quantity distribution valve;
   e. a measuring member;
   f. means mounting said measuring member within the suction tube of the system, said mounting means including abutment means which engage said control slide member;
   g. means connected to said fuel metering and quantity distribution valve for applying a resetting force to said control slide member in opposition to the force applied by said abutment means, said measuring member being displaced in proportion to the air quantity flow rate through the suction tube of the system and in opposition to the resetting force, such that said abutment means applies a force against said control slide member and displaces said control slide member in proportion to the air quantity flow rate for the purpose of metering out a fuel quantity for injection into the pre-combustion chambers and main combustion chambers of the engine, and such that a constant pressure difference is maintained by said first differential pressure valve means during the metering process between the fuel pressures prevailing upstream and downstream of the fuel metering location; and
   h. means for changing the pressure difference in dependence on engine parameters, said means for changing the pressure difference including a second differential pressure valve means for changing the pressure difference prevailing at the first differential pressure valve means, said second differential pressure valve means including a cam, oppositely disposed springs and means connecting said cam to said springs, whereby displacements of said cam alter the compression of said springs.

2. The fuel injection system as defined in claim 1, wherein the suction tube includes a region common to the main combustion chambers of the engine, and wherein the fuel injection system further comprises means in the common region of the suction tube of the system for injecting the fuel metered out to the main combustion chambers of the engine by the metering and quantity distribution valve into the common region of the suction tube of the system, ahead of the main combustion chambers of the engine.

3. The fuel injection system as defined in claim 1, wherein said second differential pressure valve means further includes means connecting said cam to the gas pedal of the engine, and wherein said cam is rotatable in dependence on the position of the gas pedal of the system.

4. The fuel injection system as defined in claim 1, wherein the suction tube of the system includes a separate branch tube for each precombustion chamber of the engine, and wherein the fuel injection system further comprises individual injection valves associated with each precombustion chamber, whereby fuel metered out to each precombustion chamber by the metering and quantity distribution valve of the fuel injection system can be injected directly into each branch ahead of each pre-combustion chamber.

5. The fuel injection system as defined in claim 1, wherein the fuel injection system further comprises a throttle flap mounted within the suction tube of the system downstream of said measuring member; a bellows connected to said suction tube and to said second differential pressure valve means, whereby said throttle flap, said bellows and said second differential pressure valve means cooperate to change the pressure difference prevailing at said first differential pressure valve means.

6. The fuel injection system as defined in claim 5, wherein the suction tube of the system includes a region common to the pre-combustion chambers of the engine, and wherein the fuel injection system further comprises means in the common region of the suction tube of the system for injecting the fuel metered out to said pre-combustion chambers by the metering and quantity distribution valve into the suction tube, ahead of the individual pre-combustion chambers.

* * * * *